United States Patent [19]

Eaton

[11] 3,792,987

[45] Feb. 19, 1974

[54] METHOD OF MAKING AN IMPROVED POROUS GLASS SUPPORT MATERIAL

[76] Inventor: David L. Eaton, 3250 Wheaton Rd., Big Flats, N.Y. 14814

[22] Filed: Mar. 27, 1972

[21] Appl. No.: 238,258

[52] U.S. Cl............................ 65/31, 55/386, 156/24, 210/198 C, 210/198 C
[51] Int. Cl............................................. C03c 15/00
[58] Field of Search........ 55/67, 386; 65/31; 156/24

[56] References Cited
UNITED STATES PATENTS

| | | | |
|---|---|---|---|
| 2,106,744 | 2/1968 | Hood et al. | 65/31 X |
| 3,549,524 | 12/1970 | Haller | 55/386 X |
| 2,315,329 | 3/1943 | Hood et al. | 65/31 |

FOREIGN PATENTS OR APPLICATIONS

| | | | |
|---|---|---|---|
| 152,291 | 7/1970 | U.S.S.R. | 65/31 |

Primary Examiner—Robert L. Lindsey, Jr.
Attorney, Agent, or Firm—James A. Giblin

[57] ABSTRACT

Porous glass support materials having two essentially distinct zones of porosity. An outer surface zone comprises an outer shell with relatively large pores of controlled diameter while an inner zone comprises a core portion having relatively smaller pores of controlled diameter. The materials are made by subjecting porous glass bodies of substantially uniform pore size to a carefully controlled alkali etching cycle in which only the outer zone of the bodies have their pores enlarged. The thus treated bodies are particularly useful as chromatographic support materials which, in use, demonstrate a desirably low height equivalent theoretical plate (HETP).

7 Claims, 4 Drawing Figures

TWO-ZONE BODY

METHOD OF MAKING AN IMPROVED POROUS GLASS SUPPORT MATERIAL

BACKGROUND OF THE INVENTION

Field of the Invention

This invention relates to porous glass bodies which are especially useful as chromatographic support materials. Porous glass, as the term is used herein, refers to glass which contains an intricate network of minute interconnected voids and channels. Such porous glass is formed by first forming an object of a glass within a certain composition range, subjecting the formed glass to heat treatment to separate it into two phases, only one of which is acid soluble, and subsequently dissolving out the soluble phase with appropriate reagents to produce the void space.

Porous glass has been used as a separation or support medium in various chromatographic applications. Among the properties of porous glass which make it especially useful as a separation medium are its extreme inertness, optical transparency, its relatively small average pore diameter, and its large surface area. Due both to its extemely high surface area (e.g., 5–500M$^2$ per gm.), and its high percentage of void space, porous glass has the capacity to absorb large amounts of water. Other liquids are similarly absorbed in large amounts. More detailed descriptions of the above properties of porous glass and how those properties may be utilized in chromatographic applications may be found in U.S. Pat. No. 3,114,692, U.S. Pat. No. 3,453,806, and U.S. Pat. No. 3,456,427, all assigned to the same assignee as the present invention.

A typical use of porous glass as a chromatographic support medium involves packing porous glass particles or beads into a column through which a solvent is pumped. Periodically, a mixture of compounds of different molecular weights are injected into the solvent stream and they pass over and around the particles. In this process, the mixture tends to separate into different molecular size ranges due to the controlled geometry of the support material which hinders the passage of molecules of varying molecular sizes. Molecules of the mixture to be separated which are larger than the average pore size are totally excluded from the pores of the support material and elute first from the bottom of the column. Next, those molecules which "just fit" the pores are eluted and so on until the probability of entry into the pores approaches 1.0 for the smallest molecules. Normally, the selectivity of such a column for mixtures of compounds to be separated is determined by what is referred to as the "height equivalent theoretical plate" (HETP) of that column.

The HETP in mm of a given column is a numerical value measured by observing the band spreading characteristics of a solute such as 100,000 M.W. dextran when injected into that column. By measuring the column length (L), the base width (W) of an elution peak and the elution volume (Ve), distance (de) or time (Te) for that peak to emerge from the column, one can calculate HETP (H) from the following relationship:

$$H = \frac{\text{Column length (cm.)}}{\text{No. of Plates } (N) \text{ generated/Column}} = \frac{L}{N}$$

where N can be calculated from the equation:

$$N = (4\,de/W)^2 \text{ or } (4\,Te/W)^2 \text{ or } (4\,Ve/W)^2.$$

Thus, $H = L/16\,(W/de)^2$ or $L/16\,(W/Te)^2$ or $L/16\,(W/Ve)^2$. It should be noted that W, de, Te, and Ve must be measured in the same units, thus permitting cancellation to a distance unit such as mm. Further information describing HETP values may be found in the book by Determan, H., *Gel Chromatography*, Springer-Verlag, New York (1968) especially at page 69 et seq.

In general, a lower value of the HETP indicates a higher efficiency of the separation process. Higher efficiency in the separation process permits a greater number of peaks to be separated. The efficiency (resolution) of a chromatographic separation depends greatly on the physiochemical characteristics of the packing material used in separation columns. The packing material provides a large surface area over which a mixture of components to be separated is passed. As the components pass through a column containing the packing material, there will be an elution delay of the components based on molecular size. As the various components elute from the column, they can be sensed by appropriate instruments and their respective amounts are commonly recorded on tracing paper and represented as peaks which may be identified with a particular component. The present invention is related to an improved porous glass packing material which assists in enhancing the resolution of such peaks.

Prior Art

Prior to this invention, processes have been developed which produced porous glass support bodies which were substantially uniform in pore size or which comprised solid bodies having porous coatings. Examples of how to produce porous glasses having substantially uniform pore sizes may be found in U.S. Pat. No. 2,106,764, issued to Hood et al., U.S. Pat. No. 3,485,687, issued to Chapman, both assigned to the present assignee, and U. S. Pat. had 3,544,524, issued to Haller.

Examples of coatings on solid particles may be found in U.S. Pat. No. 2,885,366 issued to Iler, an article by I. Halasy et al., "Micro Beads Coated with A Porous Thin Layer as Column Packing in Gas Chromatography", Anal. Chem. 36, No. 7, pp. 1178–1185 (1964), and an article by J. Kirkland, "Porous Thin Layer Modified Glass Bead Supports for Gas Liquid Chromatography", Anal. Chem. 37, No. 12, pp. 1458–1461 (1965).

Although the totally porous glass supports, made according to the teachings of the above patents, have been used successfully as chromatographic support materials, it has been found that, unfortunately, they have at least one common disadvantage. Because the above totally porous materials have a substantially uniform pore size, separation mixtures tend to diffuse throughout the materials. This diffusion contributes to band spreading which in many cases is so large that the materials have poor separation efficiencies or a high HETP.

In the case of support materials having porous coatings on solid materials, it has been found that they have improved efficiency characteristics for gas-liquid chromatography. See the above references describing coated carriers and the article by S. P. Zhadanov et al., "Application in Gas Chromatography of Granular Glasses with a Porous Surface Film", Rus. J. of Phys. Chem., June, 1963, pp. 770–772. Unfortunately, however, the solid materials which have been coated with a porous surface have a tendency to be weak and the porous coatings tend to spall off when subjected to mechanical abrasion or thermal stress. This spalling is a distinct disadvantage since the weakness of the porous coatings limits the use of such supports in columns operated under pressure and/or varying conditions of temperature.

Because of the disadvantages associated with the above support materials, there has been a continuing need for a support material which would provide desirably low HETP values and yet not be subject to palling. The present invention serves that need.

Summary of the Invention

I have found that the disadvantages associated with known support materials can be overcome or at least minimized by providing a novel porous glass support material which does not tend to spall and which has demonstrated a relatively low HETP value. The new support comprises porous glass bodies having two distinct zones of porosity. The inner zone, or core portion, comprises porous glass which has been subjected to known phase separation heat treatment followed by known acid dissolution techniques, thus providing a core portion of known average pore diameter. The outer zone, a shell portion, comprises porous glass made from the same base glass as the core portion but which has an enlarged average pore diameter, compared with the core average pore diameter, due to a carefully controlled alkali etch cycle which follows the acid dissolution treatment of the core portion.

The porous glass bodies of the present invention are made by first forming bodies of phase separable glass within a certain composition range, subjecting the glass to heat treatment to separate it into two phases, only one of which is acid soluble, dissolving a portion of the phase-separated soluble phase with an acid dissolution treatment, and then subjecting the thus-treated bodies to a critical alkali etch cycle of considerably shorter duration than past alkali etch cycles. A typical duration for the alkali etch cycle is between about 1 to 5 minutes in a 1.0 N NaOH solution at room temperature. The reduced alkali etch period limits pore enlargement to a distinct outer zone. In a preferred embodiment the etch cycle duration is about one minute. With the thus-treated glass bodies used as chromatographic support materials, separations of low HETP values are achieved.

BRIEF DESCRIPTION OF THE FIGURES

FIG. 1b is a plot showing the relationship between the HETP and linear velocity of separations performed with supports of the type illustrated by FIG. 1a.

FIG. 2b is a plot showing the relationship between the HETP and linear velocity of separations performed with supports of the type illustrated by FIG. 2a.

SPECIFIC EMBODIMENTS

Figure 1A:
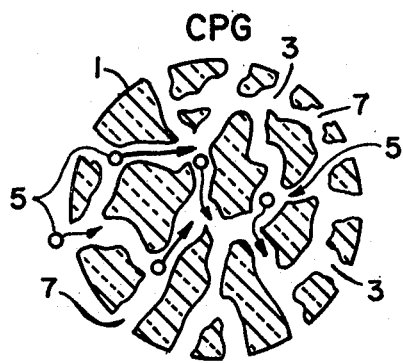
FIG. 1a is an illustrative cross section of a known porous support particle.

The base glass which may be used to embody the principles of the present invention is similar to that used in U.S. Pat. No. 3,549,524. There, for example, an alkali borosilicate glass (e.g., sodium borosilicate glass) composition is produced by mixing in a ball mill analytical grade sodium carbonate, boric acid, and ground quartz in a proportion equivalent to an $Na_2O$ to $B_2O_3$ to $SiO_2$ weight ratio of about 6.9 to 25.7 to 67.4, respectively. The mixture is fused in an electric furnace at 1200°C. until the major amount of $H_2O$ and $CO_2$ is expelled. The temperature is then elevated to about 1450°C. and maintained while stirring for about five hours. The melt is then a substantially homogeneous mixture which can then be chilled by pouring onto a cold steel plate. Chemical analysis on the oxide basis of the resulting glass shows the glass consists of about 6.0% $Na_2O$, 25.6% $B_2O_3$, and 68.4% $SiO_2$, by weight. It should be noted, however, that the above porous glass is merely representative of the type of porous glass which can utilize the principles of the present invention. In general, any alkali borosilicate glass which is phase separable can be used.

Since phase separation of the borosilicate glass is energy controlled, there are an infinite number of heat treatment cycles which may be specified to achieve a given pore size. However, there are practical and experimental conditions which commonly determine the cycle used. For example, it would be impractical to heat treat below about 450°C. because ion or molecular diffusion would be so slow that it would take years to achieve the desired state of phase separation. On the other hand, at treatment temperatures above 700°C. nucleation and crystallization of the parent glass becomes so rapid that very little phase separated, amorphous glass is obtained.

The temperature chosen often depends on the convenience of the time period to be used for the heat treatment. For example, a temperature may be chosen to correspond to a 2–4 hour shift cycle, a 16–24 hour overnight cycle, a 40–48 hour two-day cycle, or a 65–72 hour weekend cycle. Convenient heat treatment schedules which have been employed to obtain substantially uniform pores of 100A, 700A, and 2500A for a glass similar to the above glass are 560°C. for six hours, 620°C. for 16 hours, and 660°C. for 100 hours, respectively. However, it may be just as convenient, for example, to obtain a porous glass body of 550A by heat treating the base glass at 630°C. for five hours, 610°C. for 20 hours, or 590°C. for 85 hours. Thus, it can be seen that a desired heat treatment to achieve phase separation which will lead to a given average pore size is well within the technical competence of one skilled in the art, especially in view of U.S. Pat. No. 3,599,524.

After the glass is subjected to heat treatment to bring about the desired phase dissolution, the phase separated glass is crushed into small pieces in the steel mortar and fractionated by screening on stainless steel screens. Unless otherwise indicated hereafter, all glass particles used in this invention were about 120–200 mesh, U. S. Standard Sieve.

According to the above patent, the glass is then leached in a 3N HCl solution at about 50°C. for a period of about six hours or more to remove the soluble silica-poor phase. However, a shorter leach period may be used depending on the specific composition, heat treatment, desired pore size, and other factors. After the acid leach treatment, the glass particles are, typically, washed with water until free of visible colloidal silica. Since the silica-poor phase also contains silica in addition to the soluble sodium borate phase, the silica is precipitated during the leaching process with the greatest part thereof remaining in the pores of the silica-rich particles. To remove the colloidal silica from the pores of the silica-rich particles, the particles are contacted with an alkali solution, e.g., 0.5 NaOH solution at 25°C. for about two hours. The particles are then washed with water and stirred with HCl for about two hours followed by extraction with cold water for several hours. By following the teachings of the above patent, substantially uniform pore sizes averaging between 100A and 2500A can be obtained. Since the pores are substantially uniform in average size, such glass is commonly referred to as controlled pore glass, or simply CPG.

The present invention differs from the teachings of the above patent in at least one critical aspect; namely, the duration of the alkali leach cycle. Thus, whereas U.S. Pat. No. 3,549,524 and similar past processes teach an alkali leach cycle duration of about two hours or more to remove colloidal silica left from the acid leach cycle, the present invention provides alkali leach cycles of considerably shorter duration so that the alkali leach cycle is prevented from going to completion. That is, only the outer portion of the glass particles have their pores enlarged by removal of precipitated silica. This partial alkali leaching provides particles having two distinct zones of porosity which comprise one of the more important aspects of this invention.

Very broadly, my process, aside from the alkali leach cycle, is very similar to the process of the above patent. My heat treatment, as in the above patent, determines the alkali borosilicate rich phase domain size and the acid etching producing a totally porous body which has an average pore diameter range of 20A to 60A. My next major step, the alkali etching, which normally enlarges the pore structure to form 100A to 2500A, depending on the heat treatment schedule, is critically modified so as to limit the depth of the pore enlargement to a very narrow region near the surface of the particle. Control of the alkali etch step is achieved through the control of the concentration of the alkali solution and, very importantly, the period of alkali etch duration. The resulting material has a cross section appearance similar to that shown illustratively in FIG. 2a. There, in comparing an illustrative cross section of my particles with an illustrative cross section of a prior art particle of substantially uniform pore size (FIG. 1a), it can be seen that a critical difference lies in the two distinct zones of porosity, which result from the alkali leach cycle modification.

A typical process schedule for the production of a 500A average pore size surface layer over a 20A to 60A core portion is as follows:

Heat Treatment Cycle:

Heat a borosilicate glass such as the preferred glass composition of U.S. Pat. No. 3,549,524 to 620°C. for about 40 hours, and then rapidly air cool it to about 400°C.

Acid Leach Cycle:

Contact a 3:1 ratio of acid solution to glass (vol./wt.) at >90°C. for about 2 hours in a 3N HCl or HNO$_3$ solution.

Alkali Leach Cycle:

Contact the glass in a 1.0 N NaOH solution at room temperature for one to five minutes.

The duration of the alkali leach cycle will determine the amount and depth of pore enlargement and, given the teachings of this disclosure, the desired duration is thought to be well within the technical competence of one skilled in this art. Because of my relatively short alkali etch cycle, the degree of pore enlargement is easily controlled. The enlargement occurs essentially only in a surface layer leaving the pore size of the core portion substantially unaffected, and thus at its post-acid cycle average size. As a consequence of diffusion effects and solution stagnation and depletion, only the outer regions of the glass bodies are penetrated with sufficient quantities of alkali solution to enlarge the surface pore structure.

Specific examples demonstrating methods for making support materials having an enlarged average pore diameter in the outer layer are given below in conjunction with the description of the tables.

Although the glass bodies of the present invention may be used in other applications requiring inorganic support materials (e.g. as carriers for the insolubilization of enzymes, or as containers or plates for reactants providing limited inward and outward diffusion of select molecules), the bodies are particularly useful as separation media in chromatographic separation columns. Accordingly, in the examples below, the support materials were used to demonstrate improved efficiency characteristics in permeation separation.

The test compound used in comparing the permeation efficiency (HETP) of known porous glass particles and beads having a uniform pore size with the materials of the present invention was 110,000 molecular weight dextran in water (about 1 percent). The permeation efficiency (HETP) value was measured at solvent linear velocities of 4, 6, and 8 cm/min.

In chromatographic applications, the enlarged pore zone may be about 10–50 percent of the average body radius. Outer zone pore enlargement varies with increasing depth in a somewhat tapering manner to a depth of minimal alkali penetration, microscopic examination, however, indicates a fairly distinct zone of pore enlargement. For the preferred bodies, the depth of the enlarged pore zone was within about 10–25 percent of the average particle radius. Thus, for example, the pore enlargement for a 150 mesh body extends to a depth of about 10–25 percent or 1/300 inch. A comparison of the pore volume data in the tables indicates the bodies providing the desired HETP values had pore enlargement depths within that range. Pore enlargement depths outside the preferred ranges should be avoided since too shallow or too deep outer zones will not significantly assist in chromatographic peak resolution. In non-chromatographic applications, however, the pore enlargement depth may vary significantly depending on the contemplated application.

TABLE I

COMPARISON OF PERMEATION CHROMATOGRAPHY MATERIAL EFFICIENCIES

| Lot No. | Alkali Etch Cycle | Avg. Pore Diam. (A) | Pore Vol. (cc/g.) | Permeation Efficiency (HETP) | | |
|---|---|---|---|---|---|---|
| | | | | 4 cm/min. | 6 cm/min. | 8 cm/min. |
| 0117[A] | 120 min.–1N | 550 | 0.53 | 22.5 | 27.5 | 30.0 |
| 0098[A] | 5 min.–2N | 413 | 0.17 | 19 | 20 | 18 |

[A]Heat treatment 620°C.–20 hours (120/200 mesh beads)

In Table I, the glass sample designated by Lot. No. 0117[A] represents porous glass beads having pores (average pore size 550A) of substantially uniform pore diameter. This type of porous body is illustrated as CPG in FIG. 1a. All other Lot Nos. in both Table I and Table II were treated in accordance with the principles of the present invention, e.g., they were treated to alkali etch cycles of considerably less duration (one to five minutes vs. 120 minutes) to limit pore enlargement to surface layers.

As can be seen in Table I, the sample designated Lot. No. 0098[A] demonstrated improved permeation efficiencies (lower HETP values) especially at higher linear velocities. The only difference between the treatment given the control Lot No. 0117[A] and Lot. No. 0098[A] was in the alkali etch cycle. The duration of the alkali etch cycle in the Lot No. 0098[A] was only 1/24th that of the control sample. This severe limitation in the duration of the alkali etch cycle provides the limited enlargement of the pores at only the surface of the beads.

Figure 2A:
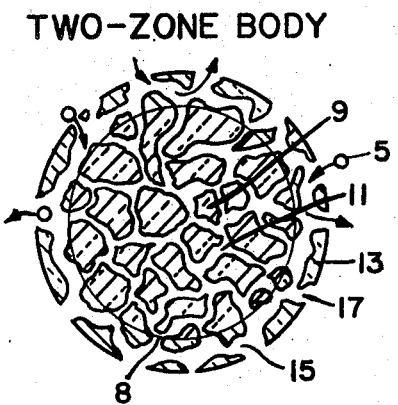
FIG. 2a is an illustration of the two-zone body of the present invention.

After it was found that the reduced alkali etch cycle for Lot. No. 0098[A] resulted in a material having an increased permeation efficiency (a lower HETP) other conditions were controlably varied to determine a preferred time period for the reduced alkali etch cycle. For all samples of Table II, the duration of the phase-separating heat treatment was doubled to 40 hours. The resulting glass, in both bead and particulate form of the indicated mesh size, was then subjected to the acid etch cycle described above to produce uniform pore diameters of 20A to 60A. Then the significantly reduced alkali etch cycle (in 1.0 N NaOH) was varied for both the particles and beads. The results are shown in Table II.

the duration of the alkali etch cycle is lowered with all other factors remaining constant. As can be seen from the tables, all samples demonstrating lower HETP values have correspondingly reduced pore volumes. The reduced pore volume confirms that pore enlargement, due to reduced alkali etch cycle, takes place only at a surface layer of the particles. This was also confirmed by microscopic examination of the porous glass, as illustrated by FIGS. 1a and 2a. As noted above, the limitation of pore enlargement to an essentially surface layer is due to the controlled alkali etch cycle whereby only the outer regions of the glass bodies are penetrated with sufficient quantities of alkali solution to substantially enlarge to pore structure.

In Lot No. 0245[D] and Lot No. 0313[D], glass particles were used rather than glass beads. Again, the only dfference between the preparation of these samples (aside from being in particular form) and the control sample was in the duration of the heat treatment and the duration of the alkali etch cycle. Although the HETP values of these samples were not as low as the values for the glass beads (Lot Nos. 0244[C] and 0309[C]) treated in a similar manner, the values are still significantly below those values of the control sample—especially when the alkali etch cycle is about one minute.

Because of the significantly reduced HETP values obtained with the glass in bead form, that form of glass is my preferred support material for chromatographic applications—especially when treated to an alkali etch cycle of about one minute as in the case of Lot No. 0309[C]. The maximum alkali etch cycle duration should not exceed about five minutes because beyond that time period, the alkali permeation becomes too great, thus not limiting pore enlargement to a surface layer only. On the other hand, it has been found that the al-

TABLE II

| Lot. No. | Alkali Etch Cycle | Avg. Pore Diam. (A) | Pore Vol. (cc/g.) | Permeation Efficiency (HETP) | | |
|---|---|---|---|---|---|---|
| | | | | 4 cm/min. | 6 cm/min. | 8 cm/min. |
| 0244[C] | 2 min.–1N | 633 | 0.17 | 6.5 | 7.5 | 8.0 |
| 0309[C] | 1 min.–1N | 387 | 0.08 | 4.5 | 5.5 | 6.0 |
| 0245[D] | 1.5 min.–1N | 519 | 0.24 | 14.5 | 17 | 18 |
| 0313[D] | 1 min.–1N | 474 | 0.09 | <8 | <8 | 9 |

[C] 120/200 mesh beads
[D] 120/200 mesh particles

In Table II, both Lot. No. 0244[C] and Lot No. 0309[C] were treated in the same manner as the beads of the control Lot No. 0117[A] of Table I except for the duration of the alkali etch cycle and the heat treatment duration. As in Lot. No. 0098[A], the alkali etch cycle was reduced considerably from the two hour (or more) cycle known in the art. As can be seen, the HETP values show considerable improvement (e.g. lowering) as kali etch cycle should be for at least about one minute to assure significant penetration of the alkali to yield a useful support material, e.g., if the alkali etch cycle is for less than one minute, the surface pore enlargement is so minimal that there is no significant permeation with the 110,000 molecular weight dextran solution used, e.g., the dextran does not penetrate even the surface pores because of its large molecular size.

Figure 1B:
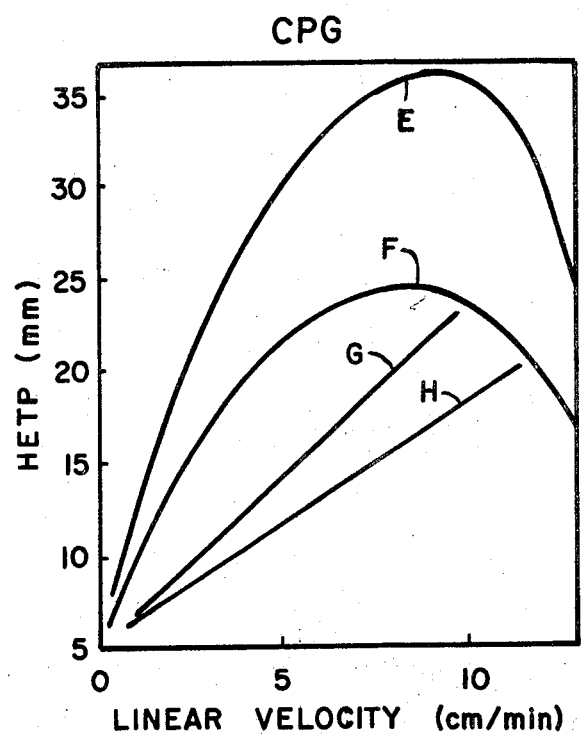
Figure 2B:
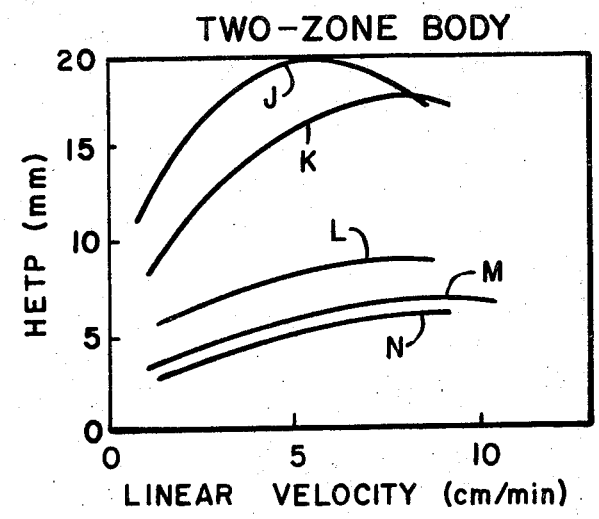

The increased permeation efficiency found in using the glass bodies of the present invention can be readily seen by comparing FIGS. 1b and 2b. FIG. 1b represents a plot of HETP values against linear velocities of the dextran which were obtained when control glass bodies having uniform pore diameters are used for separation. In FIG. 1b, the curves are designated according to the material used as follows: E and F represent the results found with two samples of porous glass beads having substantially uniform average pore diameters. E represents beads (120/200 mesh size) having a 555A average pore diameter. F represents beads (120/200 mesh size) having a 550A average pore diameter. G and H represent the results obtained when glass having substantially uniform average pore diameters of about 550A were used in particulate form (120/200 mesh size particles). The support materials of E, F, G, and H are of the type commonly used as chromatographic support materials and their substantially uniform pore size corresponds in cross section to the illustration of FIG. 1a. As can be seen, the HETP values rise considerably at a linear velocity of about 8 cm/min. for both glass beads and glass particles of about 550A average pore size.

FIG. 2b represents the results found when the glass bodies of the present invention were used for similar permeation efficiency studies. In FIG. 2b, the curves are designated according to the support material used as follows: J represents beads of Lot No. 0098$^A$ of Table I; K represents particles of Lot No. 0245$^D$; L represents particles of Lot No. 0313$^D$; M represents the beads of Lot No. 0245$^C$; and N represents the beads of Lot No. 0309$^C$. As can be seen, the HETP values are significantly lower at all corresponding linear velocities.

The material of this invention can be more fully described by again referring to FIG. 1a. There, it can be seen that, in the illustrative cross section of the control particle 1 labelled CPG, a one-piece glass body, the average pore diameters, represented by channels 3 in cross section are substantially uniform. Thus, when high molecular weight molecules 5 such as dextran (110,000 M wt.) enter the channels 3 through openings 7, their paths are essentially unrestricted, even though somewhat tortuous. These tortuous paths, in being of substantially uniform diameter, permit the particular molecules 5 to remain in the porous body for a longer time. This longer residence within the particle results in the undesirably higher HETP values, thus making peak resolution more difficult.

On the other hand, in the cross section of the two-zone particle of FIG. 2a, also a one-piece glass body, it can be seen that there are two distinct zones of porosity. These two zones are defined approximately by the illustrative circle 8. The core portion 9 inside circle 8 has pores of lower average pore diameter illustrated by the channels 11 which result from the acid leach cycle. These pores are of substantially uniform average pore diameter. The outer zone 13 outside circle 8 represents that portion of the particle which has been subjected to the shortened alkali etch cycle of the present invention. In the outer zone 13, it can be seen that the average pore size, also substantially uniform, is represented in cross section by channels 15 having opening 17 at the surface. When a high molecular weight molecule 5 (e.g., 110,000 M wt. dextran) enters an opening 17, its passage is restricted to the surface layer only because it cannot pass into the smaller channels 11 of the core portion. Thus, the molecule 5 has a shorter residence time within the particle. This shorter residence, coupled with the fact that smaller molecules that do fit into the core channels 11 have a longer residence within the particle, leads to the desirably lower HETP values. Accordingly, peak resolution is improved.

It should be noted that this improved peak resolution occurs with support materials which are integral pieces of glass. Thus, there are no coatings subject to spalling. It should also be pointed out that the control of the average pore size of both the outer zone and the core zone may depend upon the types of molecules to be separated. Thus, while it is known in the art that, through longer alkali etch cycles, uniform average pore sizes of 100A to 2500A or more are possible, the core portion of the particles of the present invention may have average pore diameters of a wide range, e.g., as low as about 100A to just less than the maximum size of 2500A. The core portion average pore size of the present invention is determined mainly by the acid etch cycle, although, of course, the composition and heat treatments also play a significant role. Thus, the core pore size can be readily determined and achieved to suit specialized needs. Then the pores of the surface zone can be enlarged according to the present teachings to any size needed for sufficient separation of molecules of a given size. The average pore diameter of the surface zone will always be larger than the average pore diameter of the core zone. The control of the average pore diameters of the two zones of the glass bodies of the present invention, with respect to each other, is thought to be well within the competence of one skilled in the art in view of this disclosure and the art which describes porous glass manufacture. Accordingly, since the above descriptions and drawings are merely illustrative, it is thought that many modifications are possible without departing from the scope of this invention, e.g., larger glass articles having two distinct zones of porosity may be made and such articles (tubes, columns, plates, etc.) may be useful in membrane separation applications where a controlled restriction on the inward or outward diffusion of molecules of a given size is desired. Accordingly, it is intended that the scope of the present invention should be limited only by the appended claims.

I claim:

1. In a method of preparing a porous glass body which comprises the steps of forming an alkali borosilicate glass, subjecting the glass to a heat treatment to separate the glass into two phases only one of which is acid soluble, and contacting the heat treated glass with an acid solution to dissolve the soluble phase, thereby forming a porous glass body of substantially uniform average pore diameter, the improvement which comprises the subsequent additional step of contacting the porous glass body with an alkali solution for a period of time sufficient to enlarge only the pores near the surface of the porous glass body, thereby providing a porous glass body having two distinct zones of porosity, an inner zone and an outer zone, the average pore diameter of the outer zone being larger than the average pore diameter of the inner zone.

2. The method, as claimed in claim 1, wherein the porous glass body which is contacted with the alkali solution has a size between 120 and 200 mesh, U.S. Standard Sieve, the alkali solution is 1 N NaOH, and the period of contact with the alkali solution is about one to five minutes.

3. The method, as claimed in claim 1, wherein the glass formed is a sodium borosilicate glass which, after contact with the acid solution, has an average pore diameter between 20A and 60A and which, after contact with the alkali solution, consists of two distinct zones of porosity, an inner zone having an average pore diameter of between 20A and 60A, and an outer zone of enlarged pores having an average pore diameter larger than the average pore diameter of the inner zone.

4. The method, as claimed in claim 1, wherein the glass body, after contact with the acid solution, is contacted with the alkali solution for a period of time sufficient to enlarge the pores to a depth of about 10 to 50 percent of the average body radius.

5. The method, as claimed in claim 4, wherein the glass body is contacted with the alkali solution for a period of time sufficient to enlarge the pores to a depth of about 10 to 25 percent of the average body radius.

6. The method, as claimed in claim 1, wherein the glass body is a particle having a particle size between 120 and 200 mesh, U.S. Standard Sieve, the alkali solution is 1 N NaOH, and the contact with the alkali solution is for a time sufficient to enlarge the pores to a depth of about 10 to 25 percent of the average body radius.

7. The method, as claimed in claim 1, wherein the glass is a sodium borosilicate glass particle having a particle size between about 120 and 200 mesh, U.S. Standard Sieve, the alkali solution is 1 N NaOH, and the period of contact with the alkali solution is about one minute.

* * * * *

UNITED STATES PATENT OFFICE
CERTIFICATE OF CORRECTION

Patent No. 3,792,987                    Dated February 19, 1974

Inventor(s) David L. Eaton

It is certified that error appears in the above-identified patent and that said Letters Patent are hereby corrected as shown below:

Front page, first column, insert item [73] -- Assignee: Corning Glass Works, Corning, N.Y. --.

Signed and sealed this 13th day of August 1974.

(SEAL)
Attest:

McCOY M. GIBSON, JR.            C. MARSHALL DANN
Attesting Officer               Commissioner of Patents